United States Patent
Wu

(10) Patent No.: US 9,137,059 B2
(45) Date of Patent: Sep. 15, 2015

(54) ELECTRONIC DEVICE AND METHOD FOR REMOVING INTERFERENTIAL SIGNALS OF MOBILE DEVICE

(71) Applicant: HON HAI PRECISION INDUSTRY CO., LTD., New Taipei (TW)

(72) Inventor: Chun-Te Wu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/262,817

(22) Filed: Apr. 28, 2014

(65) Prior Publication Data

US 2015/0188738 A1 Jul. 2, 2015

(30) Foreign Application Priority Data

Dec. 31, 2013 (CN) .......................... 2013 1 07501336

(51) Int. Cl.
  *H03D 1/04* (2006.01)
  *H04L 25/08* (2006.01)
(52) U.S. Cl.
  CPC ....................................... *H04L 25/08* (2013.01)
(58) Field of Classification Search
  CPC .................................................. G01R 13/0272
  See application file for complete search history.

(56) References Cited

U.S. PATENT DOCUMENTS

| 6,167,372 A * | 12/2000 | Maeda .......................... 704/207 |
| 2007/0126412 A1* | 6/2007 | Kimura et al. ............. 324/76.12 |
| 2008/0166057 A1* | 7/2008 | Nakajima ..................... 382/229 |
| 2009/0326930 A1* | 12/2009 | Kawashima et al. ......... 704/207 |

* cited by examiner

*Primary Examiner* — Syed Haider
*Assistant Examiner* — Fabricio R Murillo Garcia
(74) *Attorney, Agent, or Firm* — Novak Druce Connolly Bove + Quigg LLP

(57) ABSTRACT

In a method for removing interferential signals of a mobile device, a differential signal waveform corresponding to a signal frame of an original communication signal waveform of the mobile device is generated, and a DPPPV of the differential signal waveform is acquired. The differential signal is determined to be an interferential signal, in response to that the DPPPV is not less than a preset differential threshold value, and a DNPPV at a target time point is not less than a preset ratio of the DPPPV. A signal interference section is determined and compensation values corresponding to the signal interference section is calculated, to generate a differential compensation waveform of the signal frame. An integrated differential compensation waveform of all signal frames and the original communication signal waveform are incorporated to obtain a processed signal waveform without interferential signals.

15 Claims, 7 Drawing Sheets

ELECTRONIC DEVICE AND METHOD FOR REMOVING INTERFERENTIAL SIGNALS OF MOBILE DEVICE

CROSS-REFERENCE TO RELATED APPLICATIONS

This application claims all benefits accruing under 35 U.S.C. §119 from China Patent Application No. 201310750133.6, filed on Dec. 31, 2013 in the China Intellectual Property Office, the content of which is hereby incorporated by reference. This application is related to commonly-assigned application Ser. No. 14/262,818 entitled, "ELECTRONIC DEVICE AND METHOD FOR REMOVING INTERFERENTIAL SIGNALS OF MOBILE DEVICE".

FIELD

Embodiments of the present disclosure generally relate to electronic devices, and particularly to an electronic device and a method for removing interferential signals of a mobile device.

BACKGROUND

A mobile phone of a global system for mobile communications (GSM) sends a pulse signal at each 4.615 millisecond when the GSM mobile phone is calling. If there is an electronic device near the GSM mobile phone, the pulse signal may hit the electronic device at each 4.615 millisecond and generate an interferential signal.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean "at least one."

In general, the word "module", as used herein, refers to logic embodied in hardware or firmware, or to a collection of software instructions, written in a programming language. One or more software instructions in the modules may be embedded in hardware, such as in an erasable programmable read only memory (EPROM). The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
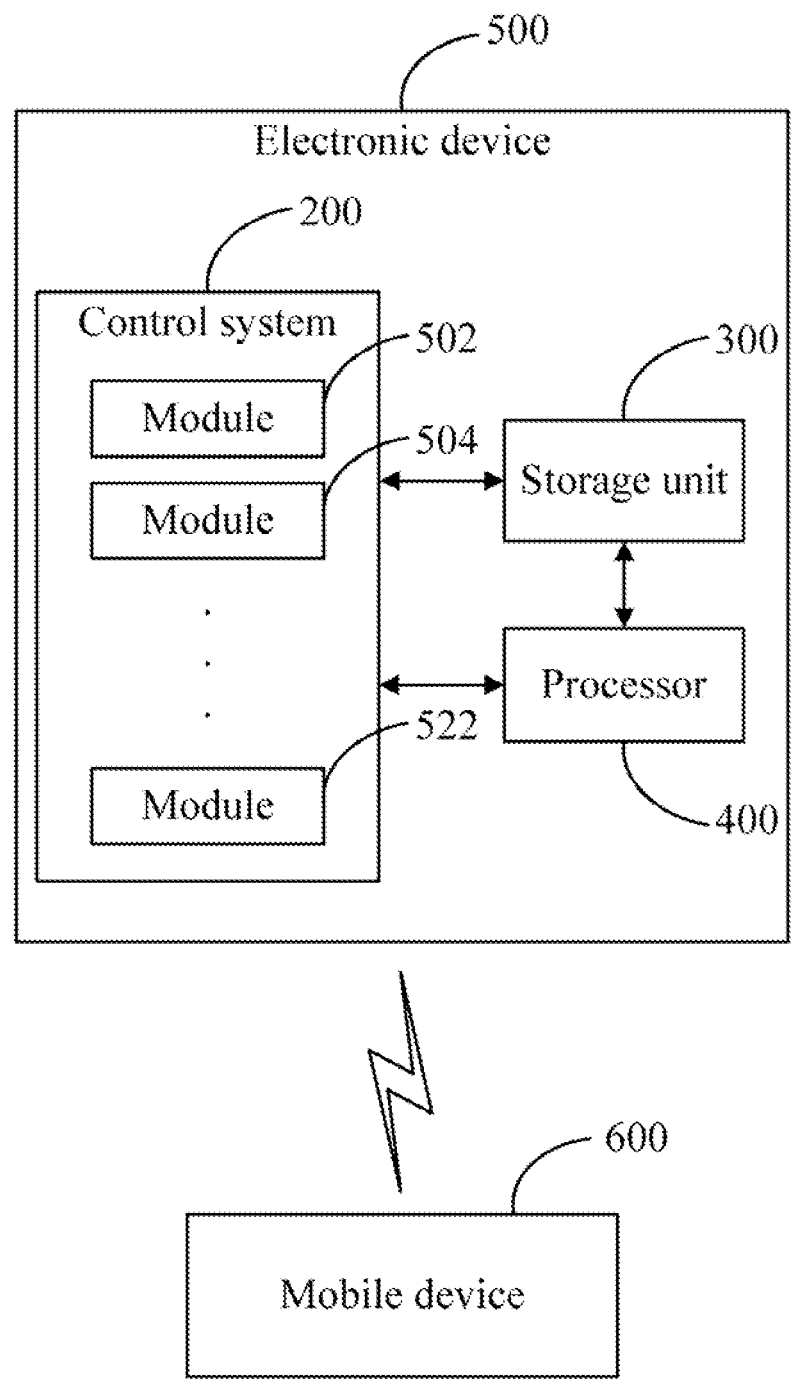
FIG. 1 is a block diagram of an embodiment of an electronic device including a control system.

FIG. 1 illustrates a block diagram of an embodiment of an electronic device 500. In the embodiment, the electronic device 500 includes a control system 200, a storage unit 300, and a processor 400. The control system 200 can remove interferential signals of a mobile device 600 near the electronic device 500. In one embodiment, the electronic device 500 can be a set-top box (STB), a mobile phone or a smart TV, and the mobile device 600 can be a GSM mobile phone, but the disclosure is not limited thereto.

In one embodiment, the control system 200 includes one or more function modules (modules 502-522 shown in FIG. 1). The one or more function modules may include computerized code in the form of one or more programs that are stored in the storage unit 300, and executed by the processor 400 to perform a method for removing interferential signals of a mobile device 600. The storage unit 300 may be a dedicated memory, such as an EPROM or a flash memory.

Figure 2:
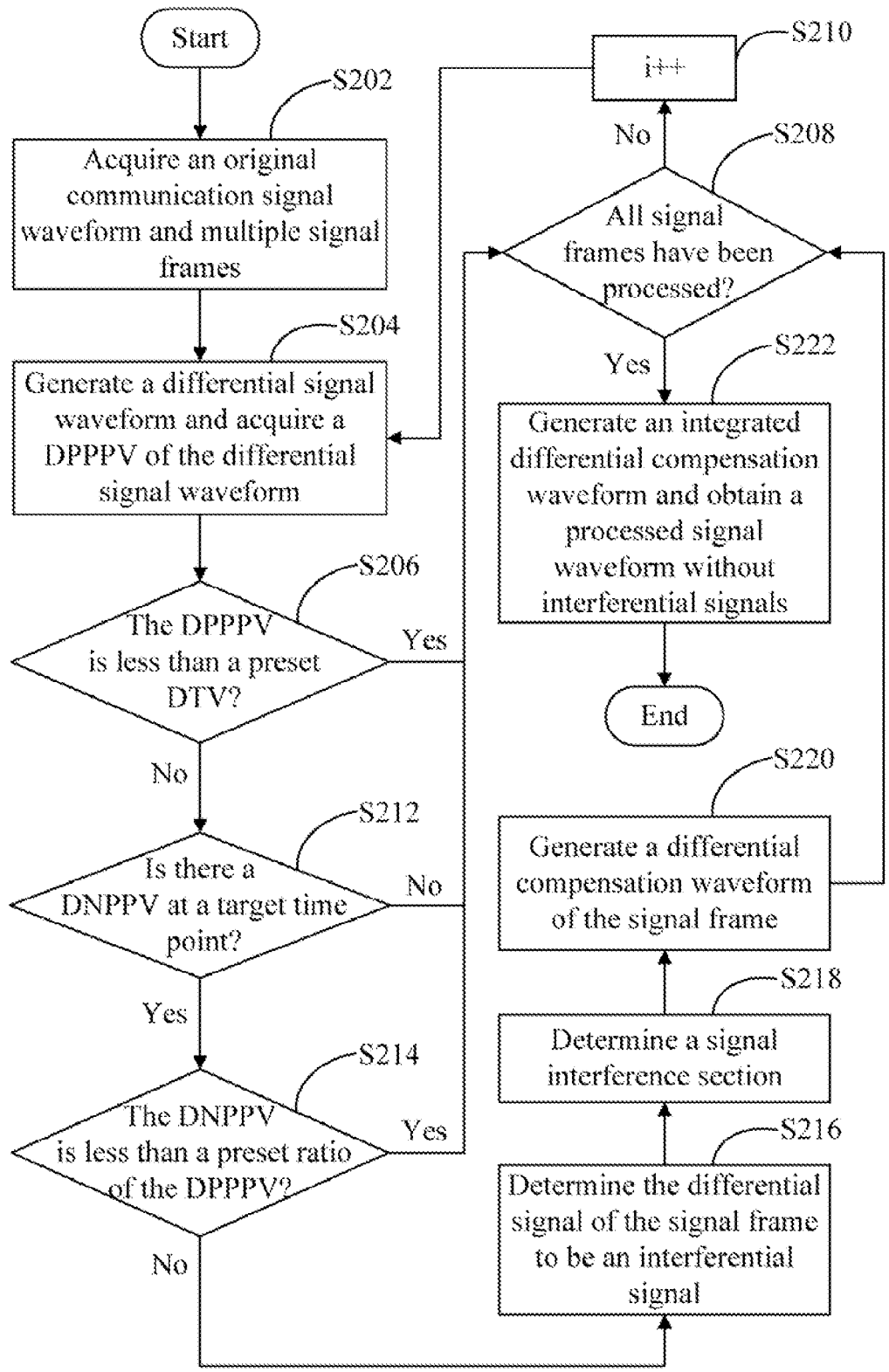
FIG. 2 is a flowchart of an embodiment of a method for removing interferential signals of a mobile device.

FIG. 2 is a flowchart of an embodiment of the method for removing interferential signals of a mobile device 600. Depending on the embodiment, additional steps may be added, others removed, and the ordering of the steps may be changed.

Figure 3:
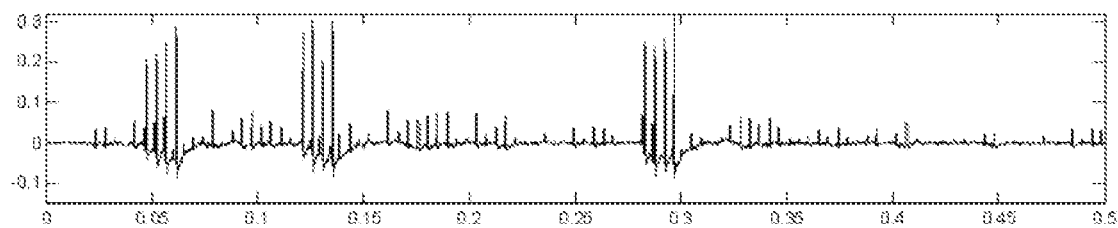
FIG. 3 illustrates an embodiment of an original communication signal waveform.

In step S202, acquiring an original communication signal waveform (as shown in FIG. 3) formed by communication signals of the mobile device 600, and acquiring multiple signal frames from the original communication signal waveform. The communication signals of the mobile device 600 may include the interferential signals.

Figure 4:
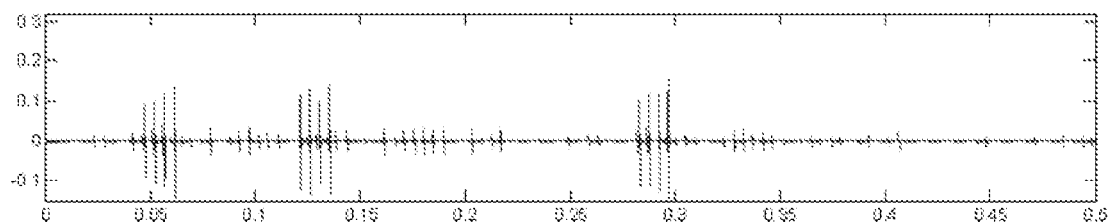
FIG. 4 illustrates an embodiment of a differential signal waveform.

In step S204, calculating a differential signal of one of the multiple signal frames using difference computation, thereby generating a corresponding differential signal waveform (as shown in FIG. 4), and acquiring a differential positive pulse peak value (DPPPV) of the differential signal waveform. In the embodiment, a formula for finding the number of the multiple signal frames is calculated "i (i=1, 2, . . . , N)" and at first i=1.

In step S206, determining whether the DPPPV is less than a preset differential threshold value (DTV). If the DPPPV is less than the preset DTV, step S208 is implemented. If the DPPPV is not less than the preset DTV, step S212 is implemented.

In step S208, determining whether all of the multiple signal frames have been processed. If all of the multiple signal frames have been processed, step S222 is implemented. If there is one or more signal frames that has not been processed, step S210 is implemented.

In step S210, adding "1" to the number "i" and returning to step S204.

Figure 5:
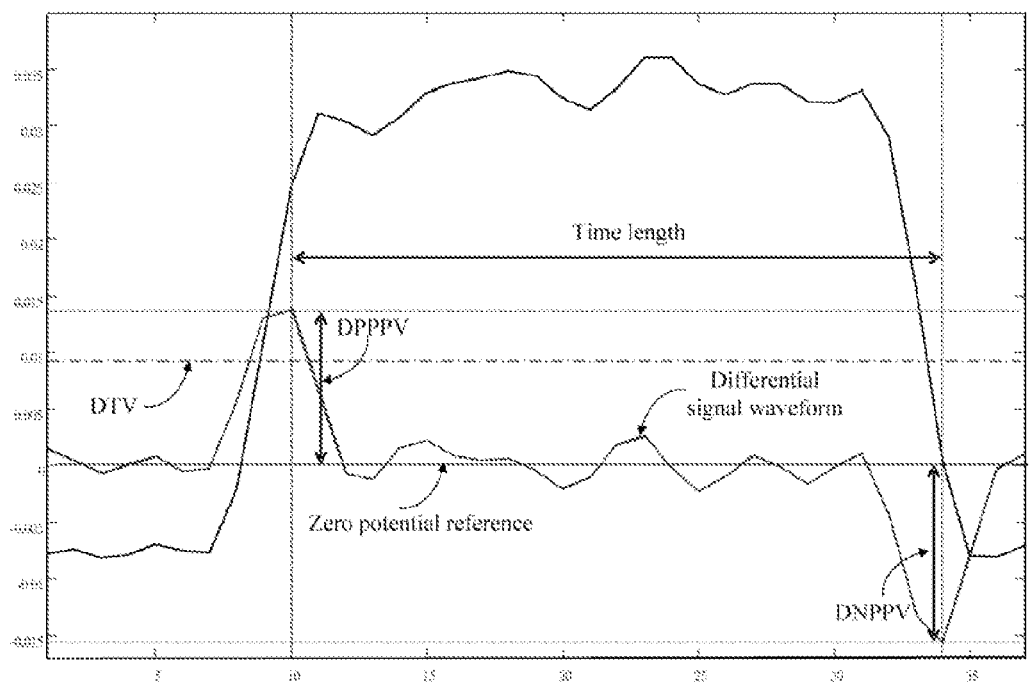
FIG. 5 illustrates an embodiment of a signal frame.

In step S212, determining whether there is a differential negative pulse peak value (DNPPV) at a target time point of the differential signal waveform. In one embodiment, the target time point is a time length (as shown in FIG. 5) away from a time point of the DPPPV in the differential signal waveform. The time length is 577 µs±100 µs or 577 µs±20 µs, for example. If there is a DNPPV at the target time point of the differential signal waveform, step S214 is implemented. If there is no DNPPV at the target time point of the differential signal waveform, step S208 is implemented.

FIG. 5 illustrates an embodiment of the signal frame. As shown in FIG. 5, the DPPPV of the differential signal waveform is more than the preset DTV, and there is a DNPPV at the target time point of the differential signal waveform.

In step S214, determining whether the DNPPV is less than a preset ratio of the DPPPV. In one embodiment, the preset ratio is 80 percent. If the DNPPV is less than the preset ratio of the DPPPV, step S208 is implemented. If the DNPPV is not less than the preset ratio of the DPPPV, steps S216-S220 are implemented.

In step S216, determining the differential signal of the signal frame to be an interferential signal.

In step S218, determining a signal interference section based on positions of wave troughs of the DPPPV and the DNPPV. In the embodiment, the signal interference section is from a left wave trough of the DPPPV to a right wave trough of the DNPPV.

In step S220, calculating compensation values corresponding to the signal interference section, to generate a differential compensation waveform of the signal frame. In the embodiment, the compensation values are reverse with the signal interference section based on a zero potential reference (as shown in FIG. 5). Then the procedure returns to step S208.

Figure 6:
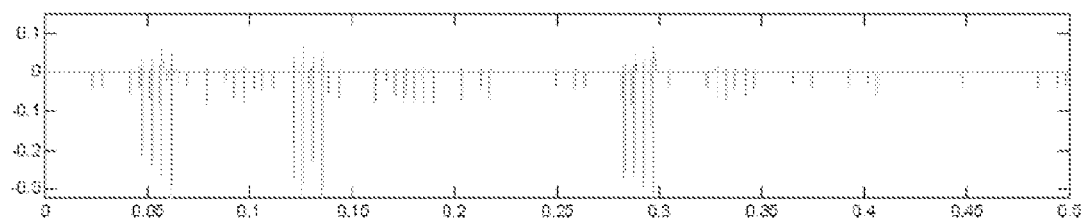
FIG. 6 illustrates an embodiment of an integrated differential compensation waveform.
Figure 7:
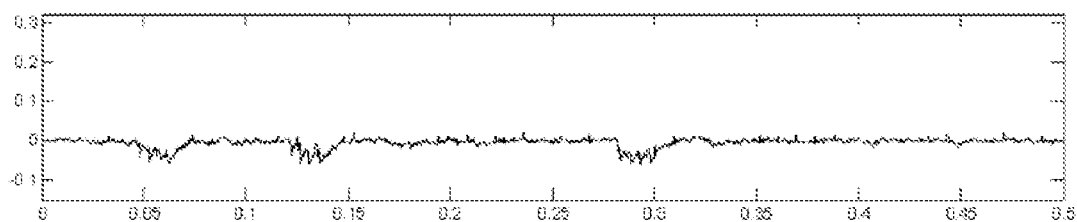
FIG. 7 illustrates an embodiment of a processed signal waveform without interferential signals.

In step S222, incorporating multiple differential compensation waveforms according to each signal frame to generate an integrated differential compensation waveform (as shown in FIG. 6), and obtaining a processed signal waveform without interferential signals (as shown in FIG. 7) according to the integrated differential compensation waveform and the original communication signal waveform. In the embodiment, the integrated differential compensation waveform and the original communication signal waveform are incorporated to obtain the processed signal waveform without interferential signals.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A method to be executed by a processor of an electronic device, the method comprising:
   (a) acquiring, by the processor, an original communication signal waveform formed by communication signals of a mobile device near the electronic device, and acquiring multiple signal frames from the original communication signal waveform;
   (b) calculating, by the processor, a differential signal of one of the multiple signal frames, to generate a corresponding differential signal waveform, and acquire a differential positive pulse peak value (DPPPV) of the differential signal waveform;
   (c) determining, by the processor, whether the differential signal of the signal frame to be is an interferential signal only when in response to that the DPPPV is not less than a preset differential threshold value, there is a differential negative pulse peak value (DNPPV) at a target time point of the differential signal waveform, and the DNPPV that is not less than a comparison preset ratio between the DNPPV and the DPPPV, otherwise determining that the differential signal is not an interferential signal;
   (d) determining, by the processor, a signal interference section based on positions of wave troughs of the DPPPV and the DNPPV;
   (e) calculating, by the processor, compensation values corresponding to the signal interference section, to generate a differential compensation waveform of the signal frame;
   (f) incorporating, by the processor, multiple differential compensation waveforms to generate an integrated differential compensation waveform in response to that all of the multiple signal frames have been processed; and
   (g) obtaining, by the processor, a processed signal waveform without interferential signals according to the integrated differential compensation waveform and the original communication signal waveform.

2. The method as claimed in claim 1, wherein in step (b), the differential signal is calculated using difference computation.

3. The method as claimed in claim 1, wherein the target time point is a time length away from a time point of the DPPPV in the differential signal waveform.

4. The method as claimed in claim 1, wherein the compensation values are reverse with the signal interference section based on a zero potential reference.

5. The method as claimed in claim 1, wherein in step (g), the integrated differential compensation waveform and the original communication signal waveform are incorporated to obtain the processed signal waveform without interferential signals.

6. A non-transitory storage medium storing a set of instructions, the set of instructions being executed by a processor of an electronic device, to perform a method comprising:
   (a) acquiring, by the processor, an original communication signal waveform formed by communication signals of a mobile device near the electronic device, and acquiring multiple signal frames from the original communication signal waveform;
   (b) calculating, by the processor, a differential signal of one of the multiple signal frames, to generate a corresponding differential signal waveform, and acquire a differential positive pulse peak value (DPPPV) of the differential signal waveform;
   (c) determining, by the processor, whether the differential signal of the signal frame to be is an interferential signal only when in response to that the DPPPV is not less than a preset differential threshold value, there is a differential negative pulse peak value (DNPPV) at a target time point of the differential signal waveform, and the DNPPV that is not less than a comparison preset ratio between the DNPPV and the DPPPV, otherwise determining that the differential signal is not an interferential signal;
   (d) determining, by the processor, a signal interference section based on positions of wave troughs of the DPPPV and the DNPPV;
   (e) calculating, by the processor, compensation values corresponding to the signal interference section, to generate a differential compensation waveform of the signal frame;
   (f) incorporating, by the processor, multiple differential compensation waveforms to generate an integrated differential compensation waveform in response to that all of the multiple signal frames have been processed; and
   (g) obtaining, by the processor, a processed signal waveform without interferential signals according to the integrated differential compensation waveform and the original communication signal waveform.

7. The non-transitory storage medium as claimed in claim 6, wherein in step (b), the differential signal is calculated using difference computation.

8. The non-transitory storage medium as claimed in claim 6, wherein the target time point is a time length away from a time point of the DPPPV in the differential signal waveform.

9. The non-transitory storage medium as claimed in claim 6, wherein the compensation values are reverse with the signal interference section based on a zero potential reference.

10. The non-transitory storage medium as claimed in claim 6, wherein in step (g), the integrated differential compensation waveform and the original communication signal waveform are incorporated to obtain the processed signal waveform without interferential signals.

11. An electronic device, the electronic device comprising:
at least one processor; and
a storage unit storing one or more programs, when executed by the at least one processor, causing the at least one processor to:
acquire an original communication signal waveform formed by communication signals of a mobile device near the electronic device, and acquire multiple signal frames from the original communication signal waveform;
calculate a differential signal of one of the multiple signal frames, to generate a corresponding differential signal waveform, and acquire a differential positive pulse peak value (DPPPV) of the differential signal waveform;
determine the differential signal of the signal frame to be is an interferential signal only when in response to that the DPPPV is not less than a preset differential threshold value, there is a differential negative pulse peak value (DNPPV) at a target time point of the differential signal waveform, and the DNPPV that is not less than a comparison preset ratio between the DNPPV and the DPPPV, otherwise determining that the differential signal is not an interferential signal;
determine a signal interference section based on positions of wave troughs of the DPPPV and the DNPPV;
calculated compensation values corresponding to the signal interference section, to generate a differential compensation waveform of the signal frame;
incorporate multiple differential compensation waveforms to generate an integrated differential compensation waveform in response to that all of the multiple signal frames have been processed; and
obtain a processed signal waveform without interferential signals according to the integrated differential compensation waveform and the original communication signal waveform.

12. The electronic device as claimed in claim 11, wherein the differential signal is calculated using difference computation.

13. The electronic device as claimed in claim 11, wherein the target time point is a time length away from a time point of the DPPPV in the differential signal waveform.

14. The electronic device as claimed in claim 11, wherein the compensation values are reverse with the signal interference section based on a zero potential reference.

15. The electronic device as claimed in claim 11, wherein the integrated differential compensation waveform and the original communication signal waveform are incorporated to obtain the processed signal waveform without interferential signals.

* * * * *